(12) United States Patent
May et al.

(10) Patent No.: US 9,637,657 B2
(45) Date of Patent: May 2, 2017

(54) LIQUID FLUOROPOLYMER COATING COMPOSITION AND FLUOROPOLYMER COATED FILM

(71) Applicant: E I DU PONT DE NEMOURS AND COMPANY, Wilmington, DE (US)

(72) Inventors: Donald Douglas May, Chadds Ford, PA (US); Brian C Auman, Avondale, PA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 97 days.

(21) Appl. No.: 14/666,917

(22) Filed: Mar. 24, 2015

(65) Prior Publication Data

US 2015/0299497 A1   Oct. 22, 2015

Related U.S. Application Data

(60) Provisional application No. 61/980,773, filed on Apr. 17, 2014.

(51) Int. Cl.

| | | |
|---|---|---|
| *B32B 27/00* | (2006.01) | |
| *C09D 127/14* | (2006.01) | |
| *C09D 127/12* | (2006.01) | |
| *C09D 127/16* | (2006.01) | |
| *C08K 5/57* | (2006.01) | |

(52) U.S. Cl.
CPC ......... *C09D 127/14* (2013.01); *C09D 127/12* (2013.01); *C08K 5/57* (2013.01); *C08L 2205/03* (2013.01); *C09D 127/16* (2013.01)

(58) Field of Classification Search
CPC .. C09D 127/16; C09D 127/14; C09D 127/12; C08L 27/18; C08L 75/04; C08L 2205/03; C08L 69/00; C08K 5/57
See application file for complete search history.

(56) References Cited

U.S. PATENT DOCUMENTS

| | | |
|---|---|---|
| 2,419,008 A | 4/1947 | Coffman et al. |
| 2,510,783 A | 6/1950 | Johnston et al. |
| 2,599,300 A | 6/1952 | Upson |
| 3,524,906 A | 8/1970 | Schmitt et al. |
| 4,931,324 A | 6/1990 | Ellison et al. |
| 5,707,697 A | 1/1998 | Spain et al. |
| 6,242,547 B1 | 6/2001 | Uschold |
| 6,403,740 B1* | 6/2002 | Uschold ............... C08F 214/18 250/253 |
| 7,553,540 B2 | 6/2009 | De Bergalis et al. |
| 7,981,478 B2 | 7/2011 | Snow et al. |
| 8,012,542 B2 | 9/2011 | Snow et al. |
| 8,025,928 B2 | 9/2011 | Snow |
| 8,048,513 B2 | 11/2011 | Marin et al. |
| 8,062,744 B2 | 11/2011 | De Bergalis et al. |
| 8,168,297 B2 | 5/2012 | Snow |
| 8,197,933 B2 | 6/2012 | De Bergalis et al. |
| 2006/0148971 A1 | 7/2006 | Jing et al. |
| 2007/0154704 A1* | 7/2007 | Debergalis ............... C08J 7/047 428/323 |
| 2009/0258990 A1 | 10/2009 | Seneker et al. |
| 2011/0086172 A1* | 4/2011 | Snow ............... B32B 17/10018 427/379 |
| 2011/0086954 A1 | 4/2011 | Snow |
| 2012/0116016 A1 | 5/2012 | Uschold |
| 2015/0034148 A1 | 2/2015 | May |

FOREIGN PATENT DOCUMENTS

WO   01/04220 A1   1/2001

OTHER PUBLICATIONS

"Product Information Zonyl PTFE MP 1600", Dupont PTFE Fluoroadditive, Oct. 1, 2012 pp. 1-2.
International Search Report for International Application No. PCT/US2015/024692 Dated Jun. 26, 2015.

* cited by examiner

*Primary Examiner* — Eisa Elhilo

(57) ABSTRACT

In a first aspect, a liquid fluoropolymer coating composition includes a first fluoropolymer selected from homopolymers and copolymers of vinyl fluoride and homopolymers and copolymers of vinylidene fluoride, a second fluoropolymer including a highly fluorinated fluoropolymer having a fluorine content of at least 60 weight percent, a compatible cross-linkable adhesive polymer, a cross-linking agent and solvent. In a second aspect, a fluoropolymer coated film includes a polymeric substrate film and a fluoropolymer coating on the polymeric substrate film. The fluoropolymer coating includes a first fluoropolymer selected from homopolymers and copolymers of vinyl fluoride and homopolymers and copolymers of vinylidene fluoride, a second fluoropolymer including a highly fluorinated fluoropolymer having a fluorine content of at least 60 weight percent and a compatible cross-linked adhesive polymer including functional groups selected from carboxylic acid, sulfonic acid, aziridine, anhydride, amine, isocyanate, melamine, epoxy, hydroxyl, and combinations thereof.

18 Claims, No Drawings

LIQUID FLUOROPOLYMER COATING COMPOSITION AND FLUOROPOLYMER COATED FILM

BACKGROUND INFORMATION

Field of the Disclosure

This disclosure relates to a liquid fluoropolymer coating composition and a fluoropolymer coated film.

Description of the Related Art

Films comprised of fluoropolymers, such as polyvinyl fluoride, ethylene/tetrafluoroethylene copolymers and perfluoropolymers (e.g., DuPont™ Teflon® FEP, DuPont™ Teflon® PFA, etc.), along with polytetrafluoroethylene coated fiberglass and silicone coated polyester are commonly used for release from composite materials such as printed circuit boards and aircraft interiors. Although they possess superior release properties, fluoropolymers have the disadvantage of being expensive. Polyester films are much cheaper, but do not possess the superior release properties of fluoropolymers and are themselves not suitable release films. A silicone coated polyester has better release properties than the polyester alone, but is known to transfer silicone to the composite material under some conditions, which can interfere with the functionality of the composite material, for example by leaving a siloxane layer on the composite affecting its adhesion properties. There exists a need for release films that combine the superior release properties of fluoropolymer film with the cost advantages of polyester film.

Liquid coating compositions can provide thin fluoropolymer films on polymeric substrate films. Examples of these systems are described in U.S. Pat. Nos. 7,553,540; 7,981,478; 8,012,542; 8,025,928; 8,048,513; 8,062,744; 8,168,297; and 8,197,933, and U.S. Patent Application Publication Nos. 2011/0086954 and 2012/0116016. Some of these systems include the use of primers on the polymeric substrate to be coated, while other systems disclose fluoropolymer coatings applied directly to unprimed polymeric substrates. In the case of using fluoropolymer coatings applied directly to unprimed polymeric substrates, it can be challenging to achieve sufficient adhesion of the fluoropolymer coating to the polymeric substrate.

SUMMARY

In a first aspect, a liquid fluoropolymer coating composition includes a first fluoropolymer selected from homopolymers and copolymers of vinyl fluoride and homopolymers and copolymers of vinylidene fluoride, a second fluoropolymer including a highly fluorinated fluoropolymer having a fluorine content of at least 60 weight percent, a compatible cross-linkable adhesive polymer, a cross-linking agent and solvent.

In a second aspect, a fluoropolymer coated film includes a polymeric substrate film and a fluoropolymer coating on the polymeric substrate film. The fluoropolymer coating includes a first fluoropolymer selected from homopolymers and copolymers of vinyl fluoride and homopolymers and copolymers of vinylidene fluoride, a second fluoropolymer including a highly fluorinated fluoropolymer having a fluorine content of at least 60 weight percent and a compatible cross-linked adhesive polymer including functional groups selected from carboxylic acid, sulfonic acid, aziridine, anhydride, amine, isocyanate, melamine, epoxy, hydroxyl, and combinations thereof. The polymeric substrate film includes functional groups that interact with the compatible cross-linked adhesive polymer to promote bonding of the fluoropolymer coating to the polymeric substrate film.

The foregoing general description and the following detailed description are exemplary and explanatory only and are not restrictive of the invention, as defined in the appended claims.

DETAILED DESCRIPTION

In a first aspect, a liquid fluoropolymer coating composition includes a first fluoropolymer selected from homopolymers and copolymers of vinyl fluoride and homopolymers and copolymers of vinylidene fluoride, a second fluoropolymer including a highly fluorinated fluoropolymer having a fluorine content of at least 60 weight percent, a compatible cross-linkable adhesive polymer, a cross-linking agent and solvent.

In one embodiment of the first aspect, the highly fluorinated fluoropolymer has a fluorine content of at least 65 weight percent.

In another embodiment of the first aspect, the highly fluorinated fluoropolymer is perfluorinated.

In yet another embodiment of the first aspect, the highly fluorinated fluoropolymer includes a polymer selected from the group consisting of polytetrafluoroethylenes, copolymers of polytetrafluoroethylene and hexafluoropropylene, copolymers of polytetrafluoroethylene and perfluoroalkylvinylether, fluoroelastomers, perfluoroelastomers and mixtures thereof.

In still another embodiment of the first aspect, the highly fluorinated fluoropolymer includes polytetrafluoroethylene micropowder.

In still yet another embodiment of the first aspect, the second fluoropolymer is present in a range of from about 0.1 to about 10 weight percent based on total fluoropolymer solids.

In another embodiment of the first aspect, the compatible cross-linkable adhesive polymer includes a polycarbonate polyol.

In still another embodiment of the first aspect, the cross-linking agent includes a blocked isocyanate functional compound or an unblocked isocyanate functional compound.

In yet another embodiment of the first aspect, the liquid fluoropolymer coating composition further includes a catalyst. In a specific embodiment, the catalyst includes an organotin compound selected from the group consisting of dibutyl tin dilaurate, dibutyl tin dichloride, stannous octanoate, dibutyl tin dilaurylmercaptide, dibutyltin diisooctylmaleate, and mixtures thereof. In another specific embodiment, the catalyst includes a mixed catalyst. The mixed catalyst includes a main catalyst including an organotin compound and a co-catalyst selected from the group consisting of organozinc compounds, organobismuth compounds, and mixtures thereof.

In a second aspect, a fluoropolymer coated film includes a polymeric substrate film and a fluoropolymer coating on the polymeric substrate film. The fluoropolymer coating includes a first fluoropolymer selected from homopolymers and copolymers of vinyl fluoride and homopolymers and copolymers of vinylidene fluoride, a second fluoropolymer including a highly fluorinated fluoropolymer having a fluorine content of at least 60 weight percent and a compatible cross-linked adhesive polymer including functional groups selected from carboxylic acid, sulfonic acid, aziridine, anhydride, amine, isocyanate, melamine, epoxy, hydroxyl, and combinations thereof. The polymeric substrate film includes functional groups that interact with the compatible cross-linked adhesive polymer to promote bonding of the fluoropolymer coating to the polymeric substrate film.

In one embodiment of the second aspect, the highly fluorinated fluoropolymer has a fluorine content of at least 65 weight percent.

In another embodiment of the second aspect, the highly fluorinated fluoropolymer is perfluorinated.

In yet another embodiment of the second aspect, the highly fluorinated fluoropolymer includes a polymer selected from the group consisting of polytetrafluoroethylenes, copolymers of polytetrafluoroethylene and hexafluoropropylene, copolymers of polytetrafluoroethylene and perfluoroalkylvinylether, fluoroelastomers, perfluoroelastomers and mixtures thereof.

In still another embodiment of the second aspect, the second fluoropolymer is present in a range of from about 0.1 to about 10 weight percent based on total fluoropolymer solids.

In still yet another embodiment of the second aspect, the polymeric substrate film includes polyester, polyamide, polyimide, or any combination thereof.

In another embodiment of the second aspect, the fluoropolymer coating has a thickness of about 0.1 to about 3.0 mils.

In yet another embodiment of the second aspect, the polymeric substrate film has a thickness of about 0.5 to about 10 mils.

In still another embodiment of the second aspect, a release film includes the fluoropolymer coated film. In a specific embodiment, the first fluoropolymer is selected from homopolymers and copolymers of vinyl fluoride.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Polyvinyl Fluorides and Polyvinylidene Fluorides

Fluoropolymers useful as a first fluoropolymer in the fluoropolymer coated film in accordance with one aspect of the invention are selected from homopolymers and copolymers of vinyl fluoride (VF) and homopolymers and copolymers of vinylidene fluoride (VDF). In one embodiment, the first fluoropolymer is selected from homopolymers and copolymers of vinyl fluoride comprising at least 60 mole % vinyl fluoride and homopolymers and copolymers of vinylidene fluoride comprising at least 60 mole % vinylidene fluoride. In a more specific embodiment, the first fluoropolymer is selected from homopolymers and copolymers of vinyl fluoride comprising at least 80 mole % vinyl fluoride and homopolymers and copolymers of vinylidene fluoride comprising at least 80 mole % vinylidene fluoride. Blends of the fluoropolymers with non-fluoropolymers, e.g., acrylic polymers, may also be suitable for the practice of some aspects of the invention. Homopolymer polyvinyl fluoride (PVF) and homopolymer polyvinylidene fluoride (PVDF) are well suited for the practice of specific aspects of the invention. First fluoropolymers selected from homopolymer polyvinyl fluoride and copolymers of vinyl fluoride are particularly effective for the practice of the present invention.

In one embodiment, with VF copolymers or VDF copolymers, comonomers can be either fluorinated or non-fluorinated or combinations thereof. By the term "copolymers" is meant copolymers of VF or VDF with any number of additional fluorinated or non-fluorinated monomer units so as to form dipolymers, terpolymers, tetrapolymers, etc. If non-fluorinated monomers are used, the amount used should be limited so that the copolymer retains the desirable properties of the fluoropolymer, e.g., release. In one embodiment, fluorinated comonomers are used including fluoroolefins, fluorinated vinyl ethers, or fluorinated dioxoles. Examples of useful fluorinated comonomers include tetrafluoroethylene (TFE), hexafluoropropylene (HFP), chlorotrifluoroethylene (CTFE), trifluoroethylene, hexafluoroisobutylene, perfluorobutyl ethylene, perfluoro (propyl vinyl ether) (PPVE), perfluoro (ethyl vinyl ether) (PEVE), perfluoro (methyl vinyl ether) (PMVE), perfluoro-2,2-dimethyl-1,3-dioxole (PDD) and perfluoro-2-methylene-4-methyl-1,3-dioxolane (PMD) among many others.

Homopolymer PVDF coatings can be formed from a high molecular weight PVDF. Blends of PVDF and alkyl (meth)acrylate polymers can be used. Polymethyl methacrylate is particularly desirable. Typically, these blends can comprise 50-90% by weight of PVDF and 10-50% by weight of alkyl (meth)acrylate polymers, in a specific embodiment, polymethyl methacrylate. Such blends may contain compatibilizers and other additives to stabilize the blend. Such blends of polyvinylidene fluoride, or vinylidene fluoride copolymer, and acrylic resin as the principal components are described in U.S. Pat. Nos. 3,524,906; 4,931,324; and 5,707,697.

Homopolymer PVF coatings can be formed from a high molecular weight PVF. Suitable VF copolymers are taught by U.S. Pat. Nos. 6,242,547 and 6,403,740 to Uschold.

Highly Fluorinated Fluoropolymers

Fluoropolymers useful as a second fluoropolymer in the fluoropolymer coated film in accordance with one aspect of the invention include highly fluorinated fluoropolymers. The term "highly fluorinated fluoropolymer", when used herein, refers to a fluoropolymer having a fluorine content of at least 60 weight percent of the overall weight of the fluoropolymer resin. In one specific embodiment, a highly fluorinated fluoropolymer has a fluorine content of at least 65 weight percent. In an even more specific embodiment, a highly fluorinated fluoropolymer has a fluorine content of at least 70 weight percent. In another specific embodiment, a highly fluorinated fluoropolymer is perfluorinated.

In one embodiment, a highly fluorinated fluoropolymer can be a polymer selected from the group consisting of polytetrafluoroethylenes (PTFE), copolymers of polytetrafluoroethylene and hexafluoropropylene (FEP), copolymers of polytetrafluoroethylene and perfluoroalkylvinylether (PFA), fluoroelastomers (FKM), perfluoroelastomers (FFKM) and mixtures thereof. In a specific embodiment, the highly fluorinated fluoropolymer can be polytetrafluoroethylene in the form of a micropowder, for example Zonyl® PTFE MP 1600 (available from the E.I du Pont de Nemours and Co., Wilmington, Del.).

In another specific embodiment, where the highly fluorinated fluoropolymer is a fluoroelastomer, the fluoroelastomer can include comonomers of vinylidene fluoride, hexafluoropropylene, tetrafluoroethylene, perfluoro (methyl vinyl ether), propylene and ethylene. Examples of these fluoroelastomers include a type 1 FKM of VDF and HFP; a type 2 FKM of VDF, HFP and TFE; a type 3 FKM of VDF, HFP, TFE and PMVE; a type 4 FKM of propylene, TFE and VDF; and a type 5 FKM of VDF, HFP, TFE, PMVE and ethylene. A specific example of a suitable fluoroelastomer is Kalrez® (available from DuPont).

In one embodiment, the second fluoropolymer is present in a range of from about 0.1 to about 10 weight percent, or from about 0.5 to about 5 weight percent, based on total fluoropolymer solids.

Compatible Cross-Linkable Adhesive Polymers and Cross-Linking Agents

The compatible cross-linkable adhesive polymers employed in the fluoropolymer coated film according to one aspect of the invention comprise functional groups selected from amine, isocyanate, hydroxyl and combinations thereof. In one embodiment, the compatible cross-linkable adhesive polymer has (1) a backbone composition that is compatible with the fluoropolymer in the composition and (2) pendant functionality capable of reacting with complementary functional groups on a substrate film surface. The compatibility of the cross-linkable adhesive polymer backbone with the fluoropolymer will vary but is sufficient so that the compatible cross-linkable adhesive polymer can be introduced into the fluoropolymer in the desired amount to secure the fluoropolymer coating to the polymeric substrate film. In general however, homo and copolymers derived largely from vinyl fluoride and vinylidene fluoride will show compatibility characteristics that will favor acrylic, urethane, aliphatic polyester, polyester urethane, polyether, ethylene vinyl alcohol copolymer, amide, acrylamide, urea and polycarbonate backbones having the functional groups described above.

In a specific embodiment, where the polymeric substrate film is an unmodified polyester with intrinsic hydroxyl and carboxylic acid functional groups (e.g., adventitious surface groups or chain ends), reactive polyols (e.g., polyester polyols, polycarbonate polyols, acrylic polyols, polyether polyols, etc.) can be used as the compatible cross-linkable adhesive polymer in the presence of an appropriate cross-linking agent (e.g., an isocyanate functional compound or a blocked isocyanate functional compound) to bond the fluoropolymer coating to the polymeric substrate film. The bonding may occur through the functional groups of the reactive polyols, the cross-linking agent, or both. Upon curing, a cross-linked adhesive polymer, such as a cross-linked polyurethane network is formed as an interpenetrating network with the fluoropolymer in the coating. In addition, it is believed that the cross-linked polyurethane network also provides the functionality that bonds the fluoropolymer coating to the polyester substrate film.

Those skilled in the art will understand that choices for compatible cross-linkable adhesive polymers and cross-linking agents can be based on compatibility with the fluoropolymer, compatibility with the selected fluoropolymer solution or dispersion, their compatibility with the processing conditions for forming the fluoropolymer coating on the selected polymeric substrate film, their ability to form cross-linked networks during formation of the fluoropolymer coating, and/or the compatibility of their functional groups with those of the polymeric substrate film in forming bonds that provide strong adherence between the fluoropolymer coating and the polymeric substrate film.

Catalyst Systems

Addition of a suitable catalyst system can accelerate the rate of reaction in order to achieve a commercially viable process. In one embodiment, a catalyst may be an organotin compound. Examples of suitable organotin compounds include dibutyl tin dilaurate (DBTDL), dibutyl tin dichloride, stannous octanoate, dibutyl tin dilaurylmercaptide and dibutyltin diisooctylmaleate.

In one embodiment, the catalyst is a mixed catalyst. The term "mixed catalyst" when used herein, refers to a catalyst system in which at least two different compounds act as catalysts for chemical reaction in a single system. In one embodiment of a mixed catalyst system, a main catalyst may be an organotin compound, and a co-catalyst may be selected from the group consisting of organozincs, organobismuths, and mixtures thereof. Suitable organotin compounds include, but are not limited to, dibutyl tin dilaurate (DBTDL), dibutyl tin dichloride, stannous octanoate, dibutyl tin dilaurylmercaptide and dibutyltin diisooctylmaleate.

In one embodiment, wherein the co-catalyst includes an organozinc compound, the co-catalyst can include a zinc carboxylate or an organozinc acetylacetone complex. Examples of suitable organozinc compounds include zinc acetylacetonate, zinc neodecanoate, zinc octanoate and zinc oleate. Suitable organozinc compounds also include BiCAT® 3228 and BiCAT® Z (both available from The Shepherd Chemical Co., Norwood, Ohio).

In another embodiment, wherein the co-catalyst includes an organobismuth compound, the co-catalyst can include an organobismuth carboxylate complex. Examples of suitable organobismuth compounds include K-KAT 348 and K-KAT 628 (both available from King Industries, Inc. Norwalk, Conn.), and BiCAT® 8, BiCAT® 8106, BiCAT® 8108 and BiCAT® 8210 (all available from Shepherd Chemical).

Numerous combinations of organotin catalysts with co-catalysts comprising organozincs, organobismuths, and mixtures thereof may be useful in the liquid fluoropolymer coating compositions described herein. Those skilled in the art will be able to select an appropriate mixed catalyst system based on the properties of the polymer system being used in the process and the desired properties of the final fluoropolymer coated film. Mixed catalyst systems for fluoropolymer coatings are described in U.S. Patent Application Publication No. 2015/0034148.

Pigments, Additives and Fillers

In one embodiment, the fluoropolymer coating compositions may contain one or more pigments, additives or other fillers. In one embodiment, pigments that can be used include both clear pigments, such as inorganic siliceous pigments (silica pigments, for example) and conventional pigments. Conventional pigments that can be used include metallic oxides such as titanium dioxide, and iron oxide; metal hydroxides; metal flakes, such as aluminum flake; chromates, such as lead chromate; sulfides; sulfates; carbonates; carbon black; silica; talc; clay; phthalocyanine blues and greens, organo reds; organo maroons and other organic pigments and dyes. In one embodiment, the type and amount of pigment is selected to prevent any significant adverse effects on the desirable properties of the fluoropolymer coating, e.g., release, as well as being selected for stability at the elevated processing temperatures that may be used during film formation.

In one embodiment, the fluoropolymer coating compositions may contain one or more light stabilizers as additives. Light stabilizer additives include compounds that absorb ultraviolet radiation such as hydroxybenzophenones, hydroxyphenyl-triazines and hydroxybenzotriazoles. Other possible light stabilizer additives include hindered amine light stabilizers (HALS) and antioxidants. Thermal stabilizers (e.g., triphenyl phosphite) can also be used, if desired.

In one embodiment, the fluoropolymer coating composition may include other fillers that may impart additional desirable properties to the liquid coating composition and/or the fluoropolymer coated film. Examples of other filler particles include mica and glass flake.

Liquid Fluoropolymer Coating Compositions

The liquid fluoropolymer coating compositions may contain the first fluoropolymer either in the form of a solution or dispersion of the fluoropolymer. Typical solutions or dispersions for the first fluoropolymer are prepared using solvents which have boiling points high enough to avoid bubble formation during the film forming/drying process. For polymers in dispersion form, a solvent which aids in coalescence of the fluoropolymer is desirable. The polymer concentration in these solutions or dispersions is adjusted to achieve a workable viscosity of the solution and will vary with the particular polymer, the other components of the coating composition, and the process equipment and conditions used. In one embodiment, for solutions, the first fluoropolymer is present in an amount of about 10 wt % to about 25 wt % based on the total weight of the liquid fluoropolymer coating composition. In another embodiment, for dispersions, the first fluoropolymer is present in an amount of about 25 wt % to about 50 wt % based on the total weight of the liquid fluoropolymer coating composition.

The form of the first fluoropolymer in the liquid fluoropolymer coating composition is dependent upon the type of fluoropolymer and the solvent used. Homopolymer PVF is normally in dispersion form. Homopolymer PVDF can be in dispersion or solution form dependent upon the solvent selected. For example, homopolymer PVDF can form stable solutions at room temperature in many polar organic solvents such as amides, ketones, esters and some ethers. Suitable examples include acetone, methylethyl ketone (MEK), N-methyl pyrrolidone (NMP), dimethyl acetamide (DMAC), and tetrahydrofuran (THF). Depending upon comonomer content and the solvent selected, copolymers of VF and VDF may be used either in dispersion or solution form.

In one embodiment, using homopolymer polyvinyl fluoride (PVF), suitable coating formulations are prepared using dispersions of the fluoropolymer. The nature and preparation of dispersions are described in detail in U.S. Pat. Nos. 2,419,008; 2,510,783; and 2,599,300. In a specific embodiment, PVF dispersions are formed in propylene carbonate (PC), γ-butyrolactone (GBL), NMP, DMAC or dimethylsulfoxide (DMSO). In addition, these dispersions may contain co-solvents, such as butoxy ethyl acetate (BEA) or propylene glycol methyl ether acetate (PMA) or others to facilitate the coating process.

To prepare the liquid fluoropolymer coating composition in dispersion form, the first fluoropolymer may be milled in a suitable solvent. Separately, a pigment dispersion along with a dispersing agent may be milled before mixing with the first fluoropolymer, the second fluoropolymer, the compatible cross-linkable adhesive polymer, the cross-linking agent, the catalyst and any other components that may be used in the coating composition. Components which are soluble in the solvent do not require milling.

A wide variety of mills can be used for the preparation of both pigment and fluoropolymer dispersions. Typically, the mill employs a dense agitated grinding medium, such as sand, steel shot, glass beads, ceramic shot, zirconia, or pebbles, as in a ball mill, an ATTRITOR® available from Union Process, Akron, Ohio, or an agitated media mill such as a "Netzsch" mill available from Netzsch, Inc., Exton, Pa. The fluoropolymer dispersion is milled for a time sufficient to cause de-agglomeration of the PVF particles. Typical residence time of the dispersion in a Netzsch mill ranges from thirty seconds up to ten minutes. Milling conditions of the fluoropolymer dispersion (e.g., temperature) are controlled to avoid swelling or gelation of the fluoropolymer particles.

The second fluoropolymer may include a highly fluorinated fluoropolymer and can be co-milled with the first fluoropolymer or milled separately in a separate operation and added as a solvent based dispersion to the first fluoropolymer dispersion to form the liquid fluoropolymer coating composition. Suitable solvents to mill the second fluoropolymer are similar to those used for the first fluoropolymer.

The compatible cross-linkable adhesive polymer is employed in the liquid fluoropolymer coating composition at a level sufficient to provide the desired bonding to the polymeric substrate film but below the level at which the desirable properties of the fluoropolymer would be significantly adversely affected. In one embodiment, the liquid fluoropolymer coating composition contains from about 1 to about 40 wt % compatible cross-linkable adhesive polymer, or from about 1 to about 25 wt %, or from about 1 to about 20 wt %, based on the weight of the fluoropolymer.

The cross-linking agent is employed in the liquid fluoropolymer coating composition at a level sufficient to provide the desired cross-linking of the compatible cross-linkable adhesive polymer. In one embodiment, the liquid coating composition contains from about 50 to about 400 mole % cross-linking agent per molar equivalent of cross-linkable adhesive polymer, or from about 75 to about 200 mole %, or from about 100 to about 150 mole %.

Catalyst may be employed in the liquid coating fluoropolymer composition to improve the process kinetics. The amount of catalyst used is typically kept to a minimum to limit any negative effects on long term adhesion between polymeric substrate films and fluoropolymer coatings formed using the liquid coating composition. In one embodiment, an organotin catalyst may be used and can be present in a range of from about 0.005 to about 0.5 parts per hundred (pph), dry basis, of catalyst to fluoropolymer resin solids, or from about 0.01 to about 0.05 pph, or from about 0.01 to about 0.02 pph.

In one embodiment, a mixed catalyst system can be used. When incorporating a mixed catalyst into the liquid fluoropolymer coating composition, an organotin catalyst can be used as a main catalyst, and can be present in a range of from about 0.005 to about 0.1 parts per hundred (pph), dry basis, of main catalyst to fluoropolymer resin solids, or from about 0.01 to about 0.05 pph, or from about 0.01 to about 0.02 pph. In one embodiment, the co-catalyst can be an organobismuth compound or an organozinc compound and can be present in a range of from about 0.05 to about 1.0 pph, dry basis, of co-catalyst to fluoropolymer resin solids, or from about 0.1 to about 0.5 pph, or from about 0.1 to about 0.2 pph.

The solids weight ratio of main catalyst to co-catalyst used in a mixed catalyst system can vary over a broad range. In one embodiment, the solids weight ratio of main catalyst to co-catalyst can be in a range of from about 0.005:1 to about 200:1, or from about 0.05:1 to about 50:1, or from about 0.1:1 to about 2:1.

The amount of catalyst used, and in the case of a mixed catalyst system, the solids weight ratio of main catalyst to co-catalyst in the mixed catalyst, will affect the cure time needed to produce good adhesion of a fluoropolymer coating to a polymeric substrate film.

Pigment, in the form of a dispersion, can be added to the liquid fluoropolymer coating composition to provide the final dry film with a desired color and opacity. In one embodiment, where the pigment is $TiO_2$, the pigment improves the UV resistance and opacity of the dry film.

In one embodiment, a liquid fluoropolymer coating compositions may have an overall solids content in the range of from about 10 to about 60 weight percent, or from about 20 to about 50 weight percent, or from about 30 to about 45 weight percent. The term "overall solids content" when used herein is expressed as a weight percentage of the dry solids in the coating composition relative to the overall weight of the liquid fluoropolymer coating compositions (including both wet and dry components).

Polymeric Substrate Films

Polymeric substrate films may be selected from a wide range of polymers, with thermoplastics being desirable for their ability to withstand higher processing temperatures. The polymeric substrate film comprises functional groups on its surface that interact with the compatible cross-linkable adhesive polymer, the cross-linking agent, or both, to promote bonding of the fluoropolymer coating to the polymeric substrate film. In one embodiment, the polymeric substrate film is a polyester, a polyamide or a polyimide. In a specific embodiment, a polyester for the polymeric substrate film is selected from polyethylene terephthalate, polyethylene naphthalate and a co-extrudate of polyethylene terephthalate/polyethylene naphthalate.

Fillers may also be included in the substrate film, where their presence may improve the physical properties of the substrate, for example, higher modulus and tensile strength. They may also improve adhesion of the fluoropolymer coating to the polymeric substrate film. One exemplary filler is barium sulfate, although others may also be used.

The surface of the polymeric substrate film which is to be coated may naturally possess some functional groups suitable for bonding, as in hydroxyl and/or carboxylic acid groups in a polyester film, or amine and/or acid functionality in a polyamide film. The presence of these intrinsic functional groups on the surface of a polymeric substrate film clearly provide commercial benefits by simplifying the process of bonding a coating onto the polymeric substrate film to form a fluoropolymer coated film. The invention employs compatible cross-linkable adhesive polymers and/or cross-linking agents in the coating composition that may take advantage of the intrinsic functionality of the polymeric substrate film. In this way, an unmodified polymeric substrate film can be chemically bonded to a fluoropolymer coating (i.e., without the use of separate primer layers or adhesives or separate surface activation treatments) to form a fluoropolymer coated film with excellent adhesion. The term "unmodified polymeric substrate film" as used herein means polymeric substrates which do not include primer layers or adhesives and which do not include surface treatment or surface activation such as are described in the following paragraph. In addition, an unprimed polymeric substrate film can be chemically bonded to a fluoropolymer coating to form a fluoropolymer coated film with excellent adhesion. The term "unprimed polymeric substrate film" as used herein means polymeric substrates which do not include primer layers but may include surface treatment or surface activation such as are described in the following paragraph.

Many polymeric substrate films may need or would further benefit from modifying to provide additional functional groups suitable for bonding to the fluoropolymer coating, however, and this may be achieved by surface treatment, or surface activation. That is, the surface can be made more active by forming functional groups of carboxylic acid, sulfonic acid, aziridine, amine, isocyanate, melamine, epoxy, hydroxyl, anhydride and/or combinations thereof on the surface. In one embodiment, the surface activation can be achieved by chemical exposure, such as to a gaseous Lewis acid such as $BF_3$ or to sulfuric acid or to hot sodium hydroxide. Alternatively, the surface can be activated by exposing one or both surfaces to an open flame while cooling the opposite surface. Surface activation can also be achieved by subjecting the film to a high frequency, spark discharge such as corona treatment or atmospheric nitrogen plasma treatment. Additionally, surface activation can be achieved by incorporating compatible comonomers into the polymeric substrate when forming a film. Those skilled in the art, will appreciate the wide variety of processes that may be used to form compatible functional groups on the surface of a polymeric substrate film.

In addition, modifying to provide additional functional groups suitable for bonding to the fluoropolymer coating may be performed by applying a primer layer to the surface of the polymeric substrate film to increase its surface functionality, as described in U.S. Pat. No. 7,553,540, DeBergalis et al., which is incorporated herein by reference in its entirety.

Coating Application

The fluoropolymer compositions for making the fluoropolymer coated film in accordance with one aspect of the present invention can be applied as a liquid directly to suitable polymeric substrate films by conventional coating means with no need to form a preformed film. Techniques for producing such coatings include conventional methods of casting, dipping, spraying and painting. When the fluoropolymer coating contains fluoropolymer in dispersion form, it is typically applied by casting the dispersion onto the substrate film, using conventional means, such as spray, roll, knife, curtain, gravure coaters, slot-die or any other method that permits the application of a uniform coating without streaks or other defects. In one embodiment, the dry coating thickness of a cast dispersion is between about 1 μm (0.04 mil) and about 75 μm (3 mils), and in a more specific embodiment, between about 2 μm (0.08 mil) and about 50 μm (2 mils), and in an even more specific embodiment, between about 6 μm (0.25 mil) and about 30 μm (1.25 mil).

After application, the compatible cross-linkable adhesive polymer is cross-linked to form a compatible cross-linked adhesive polymer, the solvent is removed, and the fluoropolymer coating is adhered to the polymeric substrate film. With some compositions in which the fluoropolymer is in solution form, the liquid fluoropolymer coating compositions can be coated onto polymeric substrate films and allowed to air dry at ambient temperatures. Although not necessary to produce a coalesced film, heating is generally desirable to cross-link the compatible cross-linkable adhesive polymer and to dry the fluoropolymer coating more quickly. Cross-linking the compatible cross-linkable adhesive polymer, removing of the solvent, and adhering of the fluoropolymer coating to the polymeric substrate can be achieved in a single heating or by multiple heatings. Drying temperatures are in the range of about 25° C. (ambient conditions) to about 220° C. (oven temperature—the film temperature may be lower). The temperature used should also be sufficient to promote the interaction of the functional groups in the compatible cross-linkable adhesive polymer and/or cross-linking agent with the functional groups of the polymeric substrate film to provide secure bonding of the fluoropolymer coating to the polymeric substrate film. This temperature varies widely with the compatible cross-linkable adhesive polymer and cross-linking agent employed and the functional groups of the polymeric substrate film. The drying temperature can range from room temperature to oven temperatures in excess of that required for the coalescence of fluoropolymers in dispersion form as discussed below.

When the fluoropolymer in the composition is in dispersion form, it is necessary for the solvent to be removed, for cross-linking of the compatible adhesive polymer to occur, and also for the fluoropolymer to be heated to a sufficiently high temperature that the fluoropolymer particles coalesce into a continuous film. In addition, bonding to the polymeric substrate film is desired. In one embodiment, fluoropolymer in the coating is heated to a cure temperature of about 150° C. to about 250° C. The solvent used desirably aids in coalescence, i.e., enables a lower temperature to be used for coalescence of the fluoropolymer coating than would be necessary with no solvent present. Thus, the conditions used to coalesce the fluoropolymer will vary with the fluoropolymer used, the solvent chosen, the thickness of the cast dispersion and the substrate film, and other operating conditions. For homopolymer PVF coatings and residence times of about 1 to about 3 minutes, oven temperatures of from about 340° F. (171° C.) to about 480° F. (249° C.) can be used to coalesce the film, and temperatures of about 380° F. (193° C.) to about 450° F. (232° C.) have been found to be particularly satisfactory. In some embodiments, a multi-zone oven may be used, where the coating is initially cured at one temperature, followed by additional curing at a different temperature, or several additional temperatures depending on the number of temperature zones in the oven. In one embodiment, a 15 foot horizontal oven may be used with the coated film moving at a rate of 20 feet per minute (fpm). A first temperature of 149° C. (300° F.) may be used for the first five feet, followed by a second temperature of 204° C. (400° F.) for the remaining 10 feet. The oven air temperatures, of course, may not be representative of the temperatures reached by the fluoropolymer coating which may be lower.

Formation of a cross-linked network of compatible cross-linked adhesive polymer in the presence of the coalescing fluoropolymer can result in the formation of interpenetrating networks of compatible cross-linked adhesive polymer and fluoropolymer, creating an interlocked network. Thus, even if there is segregation or phase separation of the two polymer networks within the fluoropolymer coating and an absence of chemical bonding between the two networks, a strong durable coating is still formed. As long as there is adequate bonding between the compatible cross-linked adhesive polymer and the polymeric substrate film, excellent adhesion between the layers of the fluoropolymer coated film can be attained.

The fluoropolymer coating composition is applied to a polymeric substrate film. In one embodiment, the polymeric substrate film is polyester, polyamide, or polyimide. In a specific embodiment, the polymeric substrate film is polyester such as polyethylene terephthalate, polyethylene naphthalate or a co-extrudate of polyethylene terephthalate/polyethylene naphthalate. In another embodiment, the fluoropolymer coating is applied to both surfaces of the substrate film. This can be performed simultaneously on both sides of the polymeric substrate film or alternatively, the coated substrate film can be dried, turned to the uncoated side and resubmitted to the same coating head to apply coating to the opposite side of the film to achieve coating on both sides of the film.

Release Applications

In one embodiment, fluoropolymer coated films are especially useful as release films in release applications. Such release film structures comprise a relatively thin fluoropolymer coating adhered to a polymeric substrate, offering the desirable release properties of fluoropolymers but with the mechanical strength of the polymeric substrate (e.g., polyester) and can be manufactured at a lower cost than a thicker fluoropolymer film. In one embodiment, release films are used in printed circuit board manufacture. In this embodiment, a photo-imaged flexible circuit board is covered with a fluoropolymer coated film and placed into a heated press for the appropriate time and temperatures required to bond the flexible circuit together. After heat pressing, the fluoropolymer coated film can be easily removed from the surface of the circuit board.

EXAMPLES

The concepts described herein will be further described in the following examples, which do not limit the scope of the invention described in the claims.

Test Methods

Adhesion Test

After coating and drying, film samples were cut, the fluoropolymer coated side placed against uncured fiber reinforced board (FR-4, Norplex-Micarta, Postville, Iowa) and pressed between two ⅛ inch thick pieces of stainless steel in a heated hydraulic press at 190° C. and 125 psi for 90 minutes. After the press cycle, the samples were removed and the film peeled by hand. Samples that peeled cleanly from the FR-4 were judge to release from FR-4.

The samples were further evaluated for whether the film readily stuck to itself (Y), showed some slight tackiness to itself (S), or did not stick to itself at all (N).

Examples 1-3 and Comparative Examples 1-3

Examples 1-3 demonstrate the release properties of fluoropolymer coated films made from liquid fluoropolymer coating compositions containing highly fluorinated fluoropolymer particles.

For Comparative Example 1 (CE1), a liquid fluoropolymer coating composition was made in a 5 gallon container by charging and mixing 6 kg of a 45 wt % PVF dispersion in propylene carbonate (PC), 2 kg of butoxy ethyl acetate (BEA, butyl CELLOSOLVE™ acetate, Dow Chemical Co., Midland, Mich.), 67.5 g of Desmophen® C-3100 polycarbonate diol (Bayer Materials Science, Pittsburgh, Pa.), 54 g of Desmodur® PL-350 isocyanate (Bayer Material Sciences) and 0.41 g dibutyl tin dilaurate (DBTDL). This liquid fluoropolymer coating composition thus contained 2.5 pph polycarbonate diol based on parts per hundred (pph) fluoropolymer resin solids, a 1:1 molar ratio of diol to isocyanate and 0.015 pph DBTDL. This mixture was applied with a reverse gravure coater to 23 micron Skyrol® SM40 polyester film (SKC Inc., Covington, Ga.) and cured in a 15 foot horizontal oven at a rate of 20 feet per minute (fpm) to give an adherent coating onto the polyester film. The oven conditions were 300° F. (149° C.) for the first five feet, and 400° F. (204° C.) for the remaining 10 feet.

The coated film was placed against a 9×9 inch uncured fiber reinforced board (FR-4, Norplex-Micarta, Postville, Iowa) and placed in a heated press for 90 minutes at 190° C. and 125 psi. The heated press had ⅛ inch stainless steel plates, a piece of PACOPADS® press pad (Pacothane Technologies, Winchester, Mass.), a piece of polytetrafluoroethylene (PTFE) film and the test release film on either side of the uncured FR-4 board. After pressing, the cured resin board was taken out and the fluoropolymer coated film released cleanly from the cured FR-4 board, but slightly stuck to itself along the edges resulting in undesirable film tearing.

For Example 1 (E1), the procedure of CE1 was repeated with the addition of 270 g of a 20 wt % dispersion of Zonyl® MP 1600 PTFE micropowder (DuPont) to the mixture, resulting in a mixture with 2 pph PTFE based on parts per hundred fluoropolymer resin solids. The fluoropolymer coated film was able to be pulled easily from the cured board without any sticking to the board or to itself.

For Comparative Examples 2 and 3 (CE2 and CE3), the procedure of CE1 (no PTFE in the coating composition) was repeated, but with higher levels of DBTDL. For Examples 2 and 3 (E2 and E3), the procedure of E1 was repeated (having 2 pph PTFE in the composition), but with higher levels of DBTDL.

Table 1 summarizes E1-E3 and CE1-CE3. Without the addition of PTFE particles to the coating composition, CE1-CE3 all result in fluoropolymer coated films that have some affinity to stick to themselves. With the addition of 2 pph PTFE particles, the fluoropolymer coated films of E1-E3 do not stick to themselves and release cleanly. The inclusion of a highly fluorinated fluoropolymer in the fluoropolymer coating allows for greater latitude in choosing a catalyst loading level in these coating compositions when producing release films.

TABLE 1

| Example | DBTDL (pph) | PTFE (pph) | Release from FR-4 | Sticks to self |
|---|---|---|---|---|
| CE1 | 0.015 | none | Y | S |
| E1 | 0.015 | 2 | Y | N |
| CE2 | 0.03 | none | Y | S |
| E2 | 0.03 | 2 | Y | N |
| CE3 | 0.045 | none | Y | Y |
| E3 | 0.045 | 2 | Y | N |

Examples 4-9 and Comparative Examples 4-9

Examples 4-9 demonstrate the release properties of fluoropolymer coated films made from liquid fluoropolymer coating compositions containing highly fluorinated fluoropolymer particles and various mixed catalyst systems.

For Comparative Example 4 (CE4), a liquid fluoropolymer coating composition was made as in CE1, with the addition of 4.1 g bismuth 2-ethylhexanoic acid (K-KAT 348, King Industries, Inc. Norwalk, Conn.) as a co-catalyst in a mixed catalyst system. This liquid fluoropolymer coating composition contained 2.5 pph polycarbonate diol based on parts per hundred (pph) fluoropolymer resin solids, a 1:1 molar ratio of diol to isocyanate, 0.015 pph DBTDL as the main catalyst and 0.15 pph K-KAT 348 as the co-catalyst (a 1:10 ratio of main catalyst to co-catalyst). The procedure of CE1 was followed for making a fluoropolymer coated film and testing its release properties. After pressing the fluoropolymer coated film of CE4 did not release from the cured resin board and ripped when trying to peel.

For Example 4 (E4), the procedure of CE4 was repeated with the addition of 270 g of a 20 wt % dispersion of Zonyl® MP 1600 PTFE micropowder to the mixture, resulting in a mixture with 2 pph PTFE based on parts per hundred fluoropolymer resin solids. The fluoropolymer coated film released cleanly from the cured FR-4 board without any sticking to the board or to itself.

Without the addition of PTFE particles to the coating composition, CE4 results in a fluoropolymer coated film that cannot be removed from the FR-4 board. With the addition of 2 pph PTFE particles, the fluoropolymer coated film of E4 does not stick to itself and releases cleanly.

For Examples 5-9 (E5-E9) and Comparative Examples 5-9 (CE5-CE9), fluoropolymer coated films were made using the procedure of CE4 using mixed catalyst systems with various catalyst loadings, both with and without the addition of highly fluorinated fluoropolymer particles. The coating compositions without the highly fluorinated fluoropolymer included (CE5-CE9) were able to release from the FR-4 board, but all stuck readily to themselves. By adding 2 pph of the highly fluorinated fluoropolymer to these compositions, the combination of release and stickiness were improved in all cases, with the exception of E9 which contained the highest catalyst loading. One skilled in the art will appreciate that the catalyst loading, mixed catalyst ratio and highly fluorinated fluoropolymer loading can be adjusted to achieve the desired release properties in a film made from these compositions. Table 2 summarizes E4-E9 and CE4-CE9.

TABLE 2

| Example | DBTDL (pph) | K-KAT 348 (pph) | PTFE (pph) | Release from FR-4 | Sticks to self |
|---|---|---|---|---|---|
| CE4 | 0.015 | 0.15 | none | N | Y |
| E4 | 0.015 | 0.15 | 2 | Y | N |
| CE5 | 0.03 | 0.15 | none | Y | Y |
| E5 | 0.03 | 0.15 | 2 | Y | S |
| CE6 | 0.03 | 0.3 | none | Y | Y |
| E6 | 0.03 | 0.3 | 2 | Y | S |
| CE7 | 0.045 | 0.15 | none | Y | Y |
| E7 | 0.045 | 0.15 | 2 | Y | N |
| CE8 | 0.045 | 0.3 | none | Y | Y |
| E8 | 0.045 | 0.3 | 2 | Y | N |
| CE9 | 0.045 | 0.45 | none | Y | Y |
| E9 | 0.045 | 0.45 | 2 | N | N |

Note that not all of the activities described above in the general description or the examples are required, that a portion of a specific activity may not be required, and one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof has been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. Further, reference to values stated in ranges include each and every value within that range.

What is claimed is:

1. A liquid fluoropolymer coating composition comprising:
- a first fluoropolymer selected from homopolymers and copolymers of vinyl fluoride and homopolymers and copolymers of vinylidene fluoride;
- a second fluoropolymer comprising a highly fluorinated fluoropolymer having a fluorine content of at least 60 weight percent, wherein the highly fluorinated fluoropolymer comprises a polymer selected from the group consisting of polytetrafluoroethylenes, copolymers of polytetrafluoroethylene and hexafluoropropylene, copolymers of polytetrafluoroethylene and perfluoroalkylvinylether, fluoroelastomers, perfluoroelastomers and mixtures thereof;
- a compatible cross-linkable adhesive polymer;
- a cross-linking agent; and
- solvent.

2. The liquid fluoropolymer coating composition of claim 1, wherein the highly fluorinated fluoropolymer has a fluorine content of at least 65 weight percent.

3. The liquid fluoropolymer coating composition of claim 1, wherein the highly fluorinated fluoropolymer is perfluorinated.

4. The liquid fluoropolymer coating composition of claim 1, wherein the highly fluorinated fluoropolymer comprises polytetrafluoroethylene micropowder.

5. The liquid fluoropolymer coating composition of claim 1, wherein the second fluoropolymer is present in a range of from about 0.1 to about 10 weight percent based on total fluoropolymer solids.

6. The liquid fluoropolymer coating composition of claim 1, wherein the compatible cross-linkable adhesive polymer comprises a polycarbonate polyol.

7. The liquid fluoropolymer coating composition of claim 1, wherein the cross-linking agent comprises a blocked isocyanate functional compound or an unblocked isocyanate functional compound.

8. The liquid fluoropolymer coating composition of claim 1, further comprising a catalyst.

9. The liquid fluoropolymer coating composition of claim 8, wherein the catalyst comprises an organotin compound selected from the group consisting of dibutyl tin dilaurate, dibutyl tin dichloride, stannous octanoate, dibutyl tin dilaurylmercaptide, dibutyltin diisooctylmaleate, and mixtures thereof.

10. A liquid fluoropolymer coating composition comprising:
- a first fluoropolymer selected from homopolymers and copolymers of vinyl fluoride and homopolymers and copolymers of vinylidene fluoride;
- a second fluoropolymer comprising a highly fluorinated fluoropolymer having a fluorine content of at least 60 weight percent;
- a compatible cross-linkable adhesive polymer;
- a cross-linking agent;
- solvent; and
- a mixed catalyst, wherein the mixed catalyst comprises:
  - a main catalyst comprising an organotin compound; and
  - a co-catalyst selected from the group consisting of organozinc compounds, organobismuth compounds, and mixtures thereof.

11. A fluoropolymer coated film comprising:
- a polymeric substrate film; and
- a fluoropolymer coating on the polymeric substrate film, wherein the fluoropolymer coating comprises:
  - a first fluoropolymer selected from homopolymers and copolymers of vinyl fluoride and homopolymers and copolymers of vinylidene fluoride;
  - a second fluoropolymer comprising a highly fluorinated fluoropolymer having a fluorine content of at least 60 weight percent, wherein the highly fluorinated fluoropolymer comprises a polymer selected from the group consisting of polytetrafluoroethylenes, copolymers of polytetrafluoroethylene and hexafluoropropylene, copolymers of polytetrafluoroethylene and perfluoroalkylvinylether, fluoroelastomers, perfluoroelastomers and mixtures thereof; and
  - a compatible cross-linked adhesive polymer comprising functional groups selected from carboxylic acid, sulfonic acid, aziridine, anhydride, amine, isocyanate, melamine, epoxy, hydroxyl, and combinations thereof;

wherein the polymeric substrate film comprises functional groups that interact with the compatible cross-linked adhesive polymer to promote bonding of the fluoropolymer coating to the polymeric substrate film.

12. The fluoropolymer coated film of claim 11, wherein the highly fluorinated fluoropolymer has a fluorine content of at least 65 weight percent.

13. The fluoropolymer coated film of claim 11, wherein the highly fluorinated fluoropolymer is perfluorinated.

14. The fluoropolymer coated film of claim 11, wherein the polymeric substrate film comprises polyester, polyamide, polyimide, or any combination thereof.

15. The fluoropolymer coated film of claim 11, wherein the fluoropolymer coating has a thickness of about 0.1 to about 3.0 mils.

16. The fluoropolymer coated film of claim 11, wherein the polymeric substrate film has a thickness of about 0.5 to about 10 mils.

17. A release film comprising the fluoropolymer coated film of claim 11.

18. The release film of claim 17, wherein the first fluoropolymer is selected from homopolymers and copolymers of vinyl fluoride.

* * * * *